United States Patent [19]
Rittler

[11] 3,892,897  
[45] July 1, 1975

[54] PROCESS FOR MAKING BASE METAL TITANATE CATALYTIC DEVICE

[75] Inventor: Hermann L. Rittler, Horseheads, N.Y.

[73] Assignee: Corning Glass Works, Corning, N.Y.

[22] Filed: Mar. 7, 1974

[21] Appl. No.: 448,835

Related U.S. Application Data

[63] Continuation-in-part of Ser. No. 294,073, Oct. 2, 1972, abandoned.

[52] U.S. Cl.......... 427/463; 117/123 B; 117/169 R; 252/461; 252/466; 252/469; 252/471; 252/472; 252/476; 423/213; 423/245; 423/247
[51] Int. Cl............................................. B01j 1/06
[58] Field of Search ......... 117/46 R, 46 CA, 169 R, 117/123 B; 252/461, 466 T, 469, 471, 472, 476; 423/213, 245, 247

[56] References Cited
UNITED STATES PATENTS
2,764,526    9/1956    Johnson ......................... 252/472 X Primary Examiner—William D. Martin  
Assistant Examiner—Janyce A. Bell  
Attorney, Agent, or Firm—Kees van der Sterre; Clinton S. Janes, Jr.; Clarence R. Patty, Jr.

[57] ABSTRACT

Processes for the preparation of base metal titanate catalysts in situ on refractory ceramic support structures which provide devices of significantly improved catalytic efficiency particularly suited for automotive exhaust emissions control applications are described. The base metal titanate catalysts comprise titaniferous crystal phases of spinel, ilmenite and/or pseudobrookite structure which consist essentially, in weight percent on the oxide basis, of about 15–85% $TiO_2$, 15–70% $M''O$, wherein $M''$ is $Mn^{+2}$, $Co^{+2}$, $Fe^{+2}$ or $Cu^{+2}$, and 0–60% $M_2'''O_3$, wherein $M'''$ is $Al^{+3}$, $Fe^{+3}$, $Cr^{+3}$, $Mn^{+3}$ or $Co^{+3}$. The process comprises preparing a solution of compounds of the desired metals, coating a refractory ceramic support structure with the solution, precipitating the desired metals from the solution onto the support structure as a coating of hydroxides, and firing the structure to convert the hydroxide coating to an oxide coating of the desired composition and crystalline structure.

4 Claims, 1 Drawing Figure

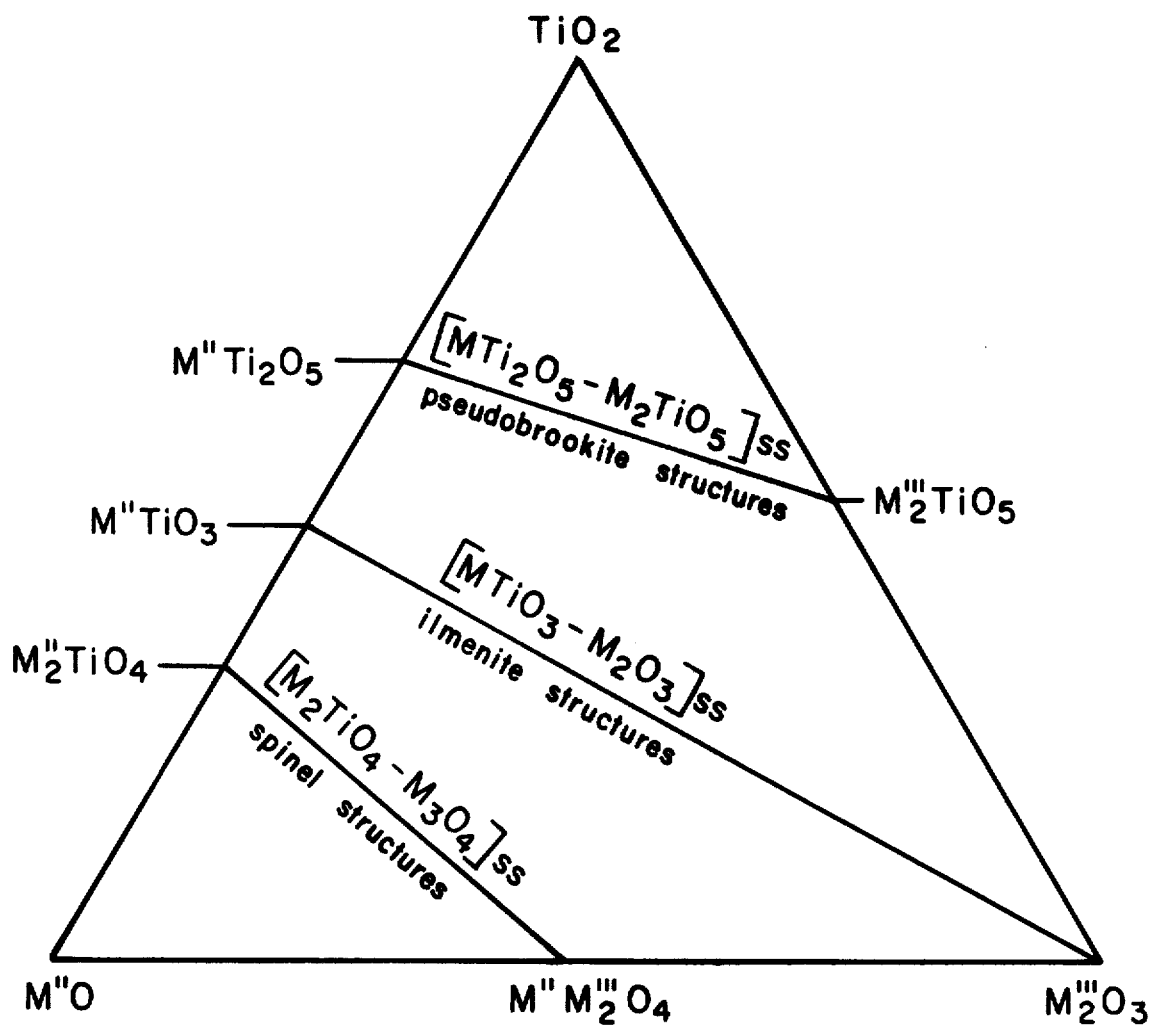
M"O-M$_2'''$O$_3$-TiO$_2$ SYSTEM

PROCESS FOR MAKING BASE METAL TITANATE CATALYTIC DEVICE

CROSS REFERENCE TO RELATED APPLICATION

This application is a continuation-in-part of the application of Hermann L. Rittler, Ser. No. 294,073, filed Oct. 2, 1972, now abandoned.

BACKGROUND OF THE INVENTION

The present invention has general application in the field of oxidation catalysis and particular application in the field of oxidation catalysts for automotive exhaust emissions control devices.

The copending application of G. H. Beall et al., Ser. No. 294,074, filed Oct. 2, 1972, entitled "Base Metal Titanate Catalysts", describes novel oxidation catalysts composed of crystalline titaniferous solid solutions of spinel, ilmenite or pseudobrookite structure which are particularly suited for use in automotive exhaust emissions control devices. The compositions of these catalytic materials, as defined in weight percent on the oxide basis, fall within the region of about 15–85% $TiO_2$, 15–70% M"O, wherein M" is selected from the group consisting of $Mn^{+2}$, $Co^{+2}$, $Fe^{+2}$ and $Cu^{+2}$, and 0–60% $M_2'''O_3$, wherein M''' is selected from the group consisting of $Al^{+3}$, $Fe^{+3}$, $Cr^{+3}$, $Mn^{+3}$ and $Co^{+3}$. Optionally, up to about one quarter or 25% of the $TiO_2$ present in these titanates may be replaced with $Nb_2O_5$, and appreciable amounts of certain other metal oxides may be present without destroying catalytic activity.

The described catalysts are crystalline in structure, typically having a major titaniferous crystal phase consisting of crystalline solid solutions of spinel ($M_2''TiO_4$—$M''M_2'''O_4$), ilmenite ($M''TiO_3$—$M_2'''O_3$), and/or pseudobrookite ($M''Ti_2O_5$—$M_2'''TiO_5$) structure. In addition to demonstrating good activity for the oxidation of carbon monoxide and short-chain hydrocarbons, these catalysts are very refractory and chemically stable at high temperatures. This combination of properties makes them eminently suitable for automotive exhaust emissions control applications.

Iron-containing titaniferous solid solutions of spinel-, ilmenite-, and pseudobrookite-type structure are found in nature and have been described by Buddington and Lindsley in "Iron-Titanium Oxide Minerals and Synthetic Equivalents", Journal of Petrology, Volume 5, Part 2, pages 310–357 (1964). The solid solutions which comprise the active phases in the catalytic devices herein described are of analogous structure.

The locations of these solid solutions in the MO—$M_2O_3$—$TiO_2$ ternary composition system are shown in the appended DRAWING. The compositions of the solid solutions fall along the lines joining the end member components thereof, the respective solid solutions being designated by bracketed pairs of end member components followed by the notation ss. The designations ss indicate a continuous range of solid solution between the end member compounds. The oxidation states of the metals M, not shown for the bracketed end member compounds, correspond to those shown for the end members at the boundaries of the ternary system.

The aforementioned copending application of Beall et al. describes in detail the means by which base metal titanate catalysts may be prepared and usefully employed in oxidative catalytic devices. That application is expressly incorporated herein by reference for a further explanation of these matters. Briefly, Beall et al. disclose that crystalline base metal titanate catalysts may be prepared by sintering a mixture of compounds of the desired metals, the desired titaniferous solid solutions then being formed by solid state reactions at elevated temperatures. The crystalline catalysts may then be applied to refractory ceramic support structures using known techniques. Catalytic devices prepared in this manner demonstrate good refractoriness and chemical stability; however, further improvements in catalytic activity would be particularly useful in automotive exhaust emissions control systems.

SUMMARY OF THE INVENTION

I have now discovered a process for preparing base metal titanate catalysts in situ on refractory ceramic support structures which produces a catalytic device of markedly improved efficiency. Thus, whereas it was initially known that a useful catalytic device could be produced by preparing a base metal titanate catalyst and thereafter applying it to a refractory ceramic support structure, I have now discovered that significant improvements in the catalytic activity of such devices may be obtained if the catalyst coating is formed in situ on the surface of the support structure from certain solutions.

Briefly, my process for producing such an improved device comprises the steps of preparing a solution of compounds of the metals selected for incorporation into the catalyst coating, contacting or impregnating a refractory ceramic support structure with the solution, precipitating the selected metals from the impregnating or coating solution onto the refractory ceramic support structure as a coating of hydroxides, and then heating the support structure to convert the hydroxide coating to an oxide coating.

The compounds selected for incorporation into the solution, which include soluble compounds of titanium and at least one other metal selected from the group consisting of Mn, Co, Fe, Cu, Al and Cr, should be added in proportions calculated to yield, upon pyrolytic conversion of the said compounds to the metal oxides, a composition consisting essentially, in weight percent, of about 15–85% $TiO_2$, 15–70% M"O, wherein M" is selected from the group consisting of $Mn^{+2}$, $Co^{+2}$, $Fe^{+2}$ and $Cu^{+2}$, and 0–60% $M_2'''O_3$, wherein M''' is selected from the group consisting of $Al^{+3}$, $Fe^{+3}$, $Cr^{+3}$, $Mn^{+3}$ or $Co^{+3}$.

Following the preparation of a solution containing the selected metallic compounds in the proper proportions, a refractory ceramic support structure is contacted with the solution, typically by immersion therein, to provide a coating of the solution on the support structure. While any of the various known ceramic catalyst support structures may be employed for this purpose, refractory ceramic support structures of the honeycomb type such as are described, for example in the patent to Hollenbach, U.S. Pat. No. 3,112,184, are preferred.

After the refractory ceramic support structure has been coated with the solution, the thus-coated support structure is contacted with an ammoniacal precipitating agent to cause the precipitation from the solution of the hydroxides of the selected metals. These hydroxides form a coating on the support structure. Suitable ammoniacal precipitating agents include $NH_4OH$ and $NH_3$; contact with these agents typically involves immersing the coated support structure into an $NH_4OH$ solution or passing an $NH_3$-containing gas over the structure.

Following precipitation of the desired hydroxide coating on the refractory support structure, the coated structure is heated to convert the hydroxide coating to an oxide coating comprising titaniferous crystal phases consisting of spinel ($M''TiO_4-M''M_2'''O_4$), ilmenite ($M''TiO_3-M_2'''O_3$), and/or pseudobrookite ($M''Ti_2O_5-M_2'''TiO_5$) solid solutions. To obtain the desired crystal phases, heating temperatures in the range from about 600°–1200°C. are suitably employed.

Comparative tests with simulated exhaust gases containing carbon monoxide and short-chain hydrocarbons show that devices prepared as above described demonstrate significantly better catalytic activity for the oxidation of hydrocarbons and carbon monoxide than do devices provided with base metal titanate catalysts prepared prior to application to the support. It is presently believed that these improvements in activity are due to finer grain size and more uniform distribution of the catalytic phases on the surface of the support structures. In any event, the increased activity is significant, and greatly enhances the suitability of devices prepared according to the invention for automotive exhaust applications.

DETAILED DESCRIPTION

In preparing the solution of compounds of the metals selected for incorporation into the base metal titanate catalyst, I employ hydrolyzable organic titanium compounds such as the lower alkoxides of titanium, having the formula $Ti(OR)_4$ wherein R is an alkyl group of one to four carbon atoms. These compounds are employed because, when stabilized with a weak organic acid such as acetic acid, they form metastable alcohol solutions from which titanium hydroxides are readily precipitated by hydrolysis. Examples of suitable titanium compounds include titanium tetraisopropoxide and titanium tetra-n-butoxide.

When incorporating the described titanium alkoxides into solutions, care must be taken to avoid hydrolysis of the compounds by the solvent prior to the application of the compound-containing solution to the ceramic support structure. For these reasons alcohols, rather than water, are the selected solvents, with lower alkanols of from one to three carbon atoms being preferred. Stabilization of the titanium alkoxides against hydrolysis by the alcohol solvent is still required, however, and this stabilization is conveniently accomplished by the addition of a weak organic acid, preferably acetic acid, to the titanium compound prior to the addition of the solvent. Preferred additions comprise an amount of acetic acid which is about 20% in excess of the volume of alcohol solvent to be employed. Other organic acids such as formic acid or carbolic acid could also be employed.

As sources of other metal ions selected for incorporation into the catalyst coating, I employ alcohol-soluble salts of the selected metals, preferably the metal nitrates, including, for example, $Fe(NO_3)_3 \cdot 9H_2O$, $Cr(NO_3)_3 \cdot 9H_2O$, $Mn(NO_3)_2$, $Al(NO_3)_3 \cdot 9H_2O$, $Cu(NO_3)_2 \cdot 3H_2O$ and $Co(NO_3)_2 \cdot 6H_2O$. Of course, other alcohol soluble salts such as chlorides, sulfates, etc. could also be employed. Preferably, these compounds are first incorporated into an alcohol solution separate from the acetic-acid-stabilized titanium alkoxide, and the two components subsequently combined. The addition of acetic acid to the alcohol solution of metal nitrates prior to combining with the stabilized alkoxide is also useful in order to avoid possible hydrolysis reactions when the two are mixed. The combination of the stabilized titanium alkoxide with the alcohol solution of metal nitrates is preferably accomplished by slowly adding the alkoxide to the nitrate solution with continuous stirring until complete solution of all compounds and thorough mixing of the solution is assured.

The coating of a refractory ceramic support structure with the solution prepared as described is preferably accomplished by immersing the support structure in the solution. Refractory ceramic support structures of the honeycomb type such as are described, for example, in the patent to Hollenbach, U.S. Pat. No. 3,112,184, are preferred. These structures may be composed of alumina, magnesia, zirconia, silica, spodumene, mullite, cordierite, or any other of a wide variety of crystalline compounds or solid solutions. Such structures typically have a high surface area-to-volume ratio which is useful in maximizing the catalytic efficiency of the supported catalyst, and reasonably good porosity which is helpful in increasing the quantity of material picked up from the solution by the immersion process.

Only a brief immersion of the refractory ceramic support structure into the compound-containing solution is ordinarily required to obtain a good coating of the solution on the support. Thereafter, the solution-coated structure is contacted with an ammoniacal precipitating agent to precipitate the hydroxides of the metals present in the solution as a coating of hydroxides on the support structure. Brief immersion in aqueous $NH_4OH$ solutions or treatment of the coated support structure with $NH_3$ vapors is suitable for this purpose. Precipitation should be undertaken soon after the application of the compound-containing solution to the refractory support structure to minimize evaporation of solvent species from the structure which could cause precipitation of compounds other than hydroxides onto the support structure. In order to avoid any problem of evaporation, treatment by immersion in aqueous $NH_4OH$ solutions immediately following immersion into the compound-containing solution is preferred.

Sufficient loading of the catalyst onto the support structure is typically achieved in a single immersion-precipitation process. However, increased catalyst loading may be achieved by multiple immersion-precipitation cycles and/or applying porous coatings composed of alumina-silica or other oxides such as magnesia, titania, ceria, etc. to the support prior to catalyst application.

Following precipitation of the desired coating of hydroxides on the refractory ceramic support structure, the hydroxide-coated structure is heated to remove volatile by-products of the precipitation reaction and to convert the hydroxide coating to a catalytically-active oxide coating comprising the desired titaniferous crystal phases.

As described in the aforementioned copending application of Beall et al., the desired active crystal phases are of three basic types, depending upon the oxide composition of the coating as calculated from the proportions of soluble compounds incorporated in the starting solution. These three types, which may be characterized as titaniferous solid solutions of spinel, ilmenite, or pseudobrookite structure, may be found alone or in any combination.

The ($M_2''TiO_4$—$M''M_2'''O_4$) solid solutions are characterized by cubic or pseudocubic (spinel type) crystalline structure and consist of titaniferous solid solutions between $M_2''TiO_4$ and $M''M_2'''O_4$ end-member compositions, $M''$ and $M'''$ being selected as hereinabove described. Active end-member compositions include $Mn_2TiO_4$, $Co_2TiO_4$ and $Fe_2TiO_4$; solid solutions between these members and other end-members such as $MnAl_2O_4$, $CoAl_2O_4$, $MnFe_2O_4$, $CoFe_2O_4$, $Fe_3O_4$ and $Co_3O_4$ are also active.

The ($M''TiO_3$—$M'''O_3$) solid solutions are characterized by hexagonal or pseudohexagonal (ilmenite-type) crystalline structure, being similar in structure to naturally-occurring ilmenite, $FeTiO_3$, and consist of titaniferous solid solutions between $M''TiO_3$ and $M_2'''O_3$ end-member compositions, $M''$ and $M'''$ being selected as hereinabove described. Active end-members include $MnTiO_3$ and $CoTiO_3$.

The ($M''Ti_2O_5$—$M_2'''TiO_5$) solid solutions are characterized by orthorhombic or pseudo-orthorhombic (pseudobrookite-type) crystalline structure, being similar in structure to naturally-occurring pseudobrookite, $Fe_2TiO_5$, and consist of titaniferous solid solutions between $M''Ti_2O_5$ and $M_2'''TiO_5$ end-member compositions, $M''$ and $M'''$ being selected as hereinbefore described. Active end-members include $MnTi_2O_5$, $CuTi_2O_5$ and $CoTi_2O_5$.

Of the above phases, the spinel and ilmenite phases are the most active, particularly when $M''$ is selected from the group consisting of $Co^{+2}$, $Cu^{+2}$ and $Mn^{+2}$. Thus catalysts having a principal crystal phase consisting essentially of titaniferous spinel and/or ilmenite solid solutions containing these ions are preferred.

Heat treatments suitable for converting the hydroxide coatings produced as described to oxide coatings containing the aforementioned active titaniferous crystal phases comprise heating the hydroxide-coated support structure to temperatures in the range from about 600°–1200°C. Heat treatments may be carried out in air or in neutral or reducing atmospheres. Heat treatment times typically range from about 1–4 hours, depending somewhat on the temperature of the treatment. The conversion process is both time and temperature dependent so that, at lower temperatures, somewhat longer treatments may usefully be employed.

The following specific example of the preparation of a catalytic device illustrates in greater detail the preferred procedures employed in carrying out the process of the present invention.

EXAMPLE

A solution of compounds of the metals selected for incorporation into the catalytic coating is prepared by first slowly adding about 200 ml. of concentrated acetic acid to 173 grams of titanium tetraisopropoxide [$Ti(OC_3H_7)_4$] while continuously stirring. In a separate container, 134 grams of $Co(NO_3)_2 \cdot 6H_2O$ is added to a commercial $Mn(NO_3)_2$ solution containing 79 grams of $Mn(NO_3)_2$, and complete solution of the compounds is insured by adding about 300 ml. of methanol and 100 ml. of concentrated acetic acid and then stirring for 3 hours. The acetic acid-stabilized titanium tetraisopropoxide is then slowly added to the nitrate solution while stirring, and stirring of the mixed solution is continued for about an hour. This mixture is calculated to yield, upon pyrolytic conversion to the metal oxides, a composition composed, in weight percent on the oxide basis, of about 48% $TiO_2$, 37% $CoO$ and 15% $MnO_2$.

A cylindrical mullite refractory ceramic support structure, 1 inch in diameter and 2-5/16 inches in length, is dipped into the above solution until thoroughly coated therewith. It is then removed, shaken to remove excess solution, and immersed in an aqueous solution (50% by volume) of $NH_4OH$ for several minutes. Following removal from the $NH_4OH$ solution, a coating consisting of the hydroxides of the metals selected for incorporation into the catalyst coating is found adhering to the ceramic support structure.

The ceramic support structure with the hydroxide coating is then heated in a reducing atmosphere (flowing forming gas containing 90% $N_2$ and 10% $H_2$ by volume) to a temperature of 600°C., held at that temperature for 2 hours, and finally cooled to room temperature. The final coating comprises major titaniferous crystal phases of ilmenite and spinel structure wherein $Co_2TiO_4$—$Mn_2TiO_4$ ss and $CoTiO_3$—$MnTiO_3$ ss are believed to constitute the predominant catalytically-active constituents.

The completed device prepared as described is tested for catalytic activity by a procedure wherein a simulated exhaust gas containing 0.9% CO, 0.0225% propylene, 1.125% oxygen, 10% water vapor and the remainder nitrogen by volume is passed through the sample at a space velocity of 15,000 hr.$^{-1}$ while the oxidation efficiency for the removal of CO and propylene is recorded as a function of temperature. The relative efficiencies of devices may be compared using this test by determining the reaction temperatures required to remove comparable proportions of the oxidizable pollutants, or by the respective amounts of removal at comparative temperatures.

Surprisingly, devices produced according to the process herein described are capable of removing significantly higher proportions of carbon monoxide and hydrocarbons from such a gas stream than are similar devices produced according to prior art methods at comparable reaction temperatues. Thus, whereas 20% removal of carbon monoxide and propylene from such a test gas stream by prior art base metal titanate catalytic devices had been thought to require reaction temperatures of about 700°F., the device shown in the Example is found to remove 50% of the carbon monoxide at 475°F. and 50% of the propylene at 620°F. from the described test gas stream under identical testing conditions.

Other examples of devices prepared according to the procedures hereinbefore described are shown in Table I below. Table I shows the oxide compositions of the catalytic coatings, in weight percent, calculated from the proportions of starting compounds, the heat treatment used in converting the precipitated hydroxie coating to the catalytically-active oxide coating, including data as to the time, temperature and atmosphere employed, and the reaction temperatures in degrees Fahrenheit required to reach 50% conversion efficiency for the oxidation of carbon monoxide (CO) and propylene (HC) in a test gas stream as hereinbefore described. The coatings were deposited in each case on honeycomb support structures of either cordierite or mullite composition. Catalyst loadings in each of the examples shown, as well as in the preceding Example, are approximately 8% by weight of the weight of the coated structure. The catalyst coatings were obtained by a single immersion-precipitation cycle as shown in the Example; however, higher loadings may of course be obtained by multiple cycles as hereinbefore described.

The oxide compositions shown in Table I are calculated from the proportions of starting compounds and in certain cases do not reflect the oxidation states of the metals after reaction to form the active titaniferous crystal phases on firing. Hence, in the case of cobalt, manganese and iron which are capable of assuming either the +2 or the +3 oxidation state in the catalysts of the invention, the distribution of metals between the divalent and trivalent states will be determined according to known laws governing high temperature oxidation in oxide systems. Important factors determining these oxidation states are the relative ease of oxidation of the metals present, the conditions of temperature and oxygen pressure surrounding the firing treatment, and the length of the treatment. The actual distribution between the +2 and +3 states in these catalysts may be determined using known analytical methods but this determination is time consuming and expensive. The active phases set forth in the following Tables are therefore identified on the basis of structural data obtained from X-ray examination and the predicted behavior of the oxides present under the firing conditions employed in the preparation of the catalysts.

In the case of Examples 2, 3, 5 and 6 of Table I, the catalyst was deposited on a mixed $SiO_2$—$Al_2O_3$ support coating covering a cordierite support structure, rather than directly to the support structure itself. In certain cases, such support coatings are useful to improve the surface area of the surface supporting the catalyst or to protect the catalyst from interaction with the support structure at high temperatures. However, such support coatings are not required except where catalyst-support structure interactions might poison the activity of the catalyst.

Table II below sets forth additional catalyst compositions which may be applied to supports using the precipitation method of the present invention, employing other salts such as $Cr(NO_3)_3 \cdot 9H_2O$ and $Al(NO_3)_3 \cdot 9H_2O$ in addition to the salts of cobalt, manganese, copper and iron. The oxide compositions set forth are again calculated in weight percent from the proportions of compounds present in the starting titanium alkoxide solutions. Also shown are the structures and compositions of titaniferous crystal phases believed to constitute the most active phases present in the compositions set forth after firing treatment, Sp referring to spinel-type structures, Ilm referring to ilmenite-type structures, and Ps-B referring to pseudobrookite-type structures.

TABLE I

| Calculated Coating Oxide Composition (weight %) | Firing Treatment Time/Temperature | Atmosphere | | Active Titaniferous Crystal Phase | 50% Conversion Temperature HC (°F.) | CO (°F.) |
|---|---|---|---|---|---|---|
| 1 | 48 $TiO_2$-37 CoO-15 $MnO_2$ | 2 hours/1200°C. | CO | 1 | $CoTiO_3$-$MnTiO_3$ ss, $Co_2TiO_4$-$Mn_2TiO_4$ ss | 700 | 600 |
| 2 | 48 $TiO_2$-37 CoO-15 $MnO_2$ | 2 hours/800°C. | CO | 2 | $CoTiO_3$-$MnTiO_3$ ss, $Co_2TiO_4$-$Mn_2TiO_4$ ss | 680 | 640 |
| 3 | 48 $TiO_2$-37 CoO-15 $MnO_2$ | 2 hours/600°C. | CO | 3 | $CoTiO_3$-$MnTiO_3$ ss, $Co_2TiO_4$-$Mn_2TiO_4$ ss | 640 | 550 |
| 4 | 36 $TiO_2$-30 $MnO_2$-34 CuO | 2 hours/600°C. | CO | 4 | $Cu_2TiO_4$-$Mn_2TiO_4$-$Cu_2MnO_4$ ss | 620 | 430 |
| 5 | 36 $TiO_2$-30 $MnO_2$-34 CuO | 2 hours/800°C. | CO/$N_2$ | 5 | $Cu_2TiO_4$-$Mn_2TiO_4$-$Cu_2MnO_4$ ss | 665 | 485 |
| 6 | 36 $TiO_2$-30 $MnO_2$-34 CuO | 2 hours/800°C. | CO | 6 | $Cu_2TiO_4$-$Mn_2TiO_4$-$Cu_2MnO_4$ ss | 700 | 565 |
| 7 | 36 $TiO_2$-10 $MnO_2$-54 CuO | 4 hours/1000°C. | CO | 7 | $Cu_2TiO_4$-$Mn_2TiO_4$-$Cu_2MnO_4$ ss | 730 | 550 |
| 8 | 36 $TiO_2$-64 $Fe_2O_3$ | 2 hours/1200°C. | CO | 8 | $Fe_2TiO_4$-$Fe_3O_4$ ss, $FeTiO_3$ | 825 | 705 |
| 9 | 36 $TiO_2$-10 $MnO_2$-54 CuO | 2 hours/800°C. | Air | 9 | $Cu_2TiO_4$-$Mn_2TiO_4$-$Cu_2MnO_4$ ss | 895 | 775 |

TABLE II

| Batch Oxide Composition | 1 | 2 | 3 | 4 | 5 | 6 | 7 | 8 |
|---|---|---|---|---|---|---|---|---|
| $TiO_2$ | 69.5 | 62.5 | 66.0 | 52.0 | 25.0 | 40.0 | 68.5 | 53.0 |
| $Al_2O_3$ | — | 13.5 | 4.5 | — | 30.0 | 20.0 | — | — |
| $Fe_2O_3$ | — | — | — | — | 45.0 | 40.0 | 32.0 | — |
| CoO | — | — | 29.5 | 48.0 | — | — | — | 47.0 |
| MnO | 30.5 | 24.0 | — | — | — | — | — | — |
| Crystal Structure | Ps-B | Ps-B | Ps-B | Ilm, Sp, Ps-B | Sp, Ps-B | Sp, Ps-B | Ps-B | Ilm |
| Active Phase | $MnTi_2O_5$ | $MnTi_2O_5$-$Al_2TiO_5$ ss | $CoTi_2O_5$-$Al_2TiO_5$ ss | $CoTiO_3$, $Co_2TiO_4$, $CoTi_2O_5$ | $Co_2TiO_4$-$CoAl_2O_4$ ss $CoTi_2O_5$-$Al_2TiO_5$ ss | $Co_2TiO_4$-$CoAl_2O_4$ ss, $CoTi_2O_5$-$Al_2TiO_5$ ss | $CoTi_2O_5$ | $MnTiO_3$ |

| Batch Oxide Composition | 9 | 10 | 11 | 12 | 13 | 14 | 15 | 16 |
|---|---|---|---|---|---|---|---|---|
| $TiO_2$ | 25.0 | 40.0 | 26.0 | 51.0 | 23.5 | 35.5 | 41.0 | 21.0 |
| $Al_2O_3$ | 30.0 | 20.0 | — | — | — | — | — | — |
| $Fe_2O_3$ | — | — | 38.5 | 25.5 | 11.5 | — | 41.0 | 21.0 |
| CoO | — | — | 25.5 | 23.5 | 65.0 | 49.0 | — | 58.0 |
| MnO | 45.0 | 40.0 | — | — | — | 15.0 | 18.0 | — |
| Crystal Structure | Sp, Ilm, Ps-B | Ilm, Sp, Ps-B | Sp | Sp | Sp | Sp | Sp | Sp |
| Active Phase | $Mn_2TiO_4$-$MnAl_2O_4$ ss, $MnTiO_3$-$Mn_2O_3$ ss, $MnTi_2O_5$-$Al_2TiO_5$ ss | $MnTiO_3$-$Mn_2O_3$ ss, $Mn_2TiO_4$-$MnAl_2O_4$ ss, $MnTi_2O_5$-$Al_2TiO_5$ ss | $Co_2TiO_4$-$CoFe_2O_4$-$Fe_3O_4$ ss | $Co_2TiO_4$-$CoFe_2O_4$-$Fe_3O_4$ ss | $Co_2TiO_4$-$CoFe_2O_4$-$Fe_3O_4$ ss | $Co_2TiO_4$-$Mn_2TiO_4$-$Mn_3O_4$ ss | $Mn_2TiO_4$-$MnFe_2O_4$-$Fe_3O_4$ ss | $Co_2TiO_4$-$CoFe_2O_4$ ss |

From the above data it is apparent that the process as herein described produces a device of markedly improved efficiency in comparison with devices employing base metal titanate catalysts which have been prepared using prior art methods. The process therefore constitutes a useful advance in the art of producing oxidative catalytic devices.

I claim:

1. A process for making a base metal titanate catalytic device which comprises the steps of:
   a. preparing an acid-stabilized alcohol solution consisting essentially of a lower alkanol, a weak organic acid, and alcohol-soluble compounds, said alcohol-soluble compounds including a lower alkoxide of titanium and a salt of at least one other metal selected from the group consisting of Mn, Co, Fe, Cu, Al and Cr, and said alcohol-soluble compounds being present in proportions calculated to yield, upon pyrolytic conversion to the metal oxides, a composition consisting essentially, in weight percent, of about 15–85% $TiO_2$, 15–70% $M''O$, wherein $M''$ is $Mn^{+2}$, $Co^{+2}$, $Fe^{+2}$ or $Cu^{+2}$, and 0–60% $M_2'''O_3$, wherein $M'''$ is $Al^{+3}$, $Fe^{+3}$, $Cr^{+3}$, $Mn^{+3}$ or $Co^{+3}$;
   b. contacting a refractory ceramic support structure with said solution to produce a solution-coated support structure;
   c. contacting said solution-coated support structure with an ammoniacal precipitating agent to precipitate from said solution onto said support structure a coating of the hydroxides of said titanium and other metals; and thereafter
   d. heating said structure to a temperature in the range of about 600°–1200°C. for a time in the range of about 1–4 hours to convert said coating of hydroxides to an oxide coating comprising at least one titaniferous crystal phase selected from the group consisting of:
      i. $M_2''TiO_4$—$M''M_2'''O_4$ solid solutions of cubic or pseudocubic structure;
      ii. $M''TiO_3$—$M_2'''O_3$ solid solutions of hexagonal or pseudohexagonal structure; and
      iii. $M''Ti_2O_5$—$M_2'''TiO_5$ solid solutions of orthorhombic or pseudo-orthorhombic structure.

2. A process according to claim 1 wherein the lower alkoxide of titanium is titanium tetraisopropoxide.

3. A process according to claim 1 wherein the salt is selected from the group consisting of $Fe(NO_3)_3.9H_2O$, $Cr(NO_3)_3.9H_2O$, $Mn(NO_3)_2$, $Al(NO_3)_3.9H_2O$, $Cu(NO_3)_2.3H_2O$ and $Co(NO_3)_2.6H_2O$.

4. A process according to claim 1 wherein the weak organic acid is acetic acid.

* * * * *